US010451509B2

United States Patent
Mehrer et al.

(10) Patent No.: US 10,451,509 B2
(45) Date of Patent: Oct. 22, 2019

(54) METHOD FOR DETERMINING A FAULT WITHIN A FLOW DIVIDER

(71) Applicant: UNITED TECHNOLOGIES CORPORATION, Farmington, CT (US)

(72) Inventors: Michael E. Mehrer, San Diego, CA (US); Kenneth W. Winston, San Diego, CA (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 363 days.

(21) Appl. No.: 14/662,353

(22) Filed: Mar. 19, 2015

(65) Prior Publication Data
US 2016/0091381 A1 Mar. 31, 2016

Related U.S. Application Data

(60) Provisional application No. 62/007,587, filed on Jun. 4, 2014.

(51) Int. Cl.
*F02C 7/232* (2006.01)
*F02C 7/22* (2006.01)
(Continued)

(52) U.S. Cl.
CPC ............... *G01L 13/00* (2013.01); *F02C 7/22* (2013.01); *F02C 7/232* (2013.01); *F02C 7/236* (2013.01);
(Continued)

(58) Field of Classification Search
CPC .... F02C 7/22; F02C 7/232; F02C 7/26; F02C 7/236; F02C 9/26; F02C 9/46; F05D 2270/09; F02D 41/22; F02D 41/221; F02D 41/222; F02D 2041/223; F02D 2041/224; F02D 2041/225; F02D 2041/228; G01L 13/00; G01M 15/14
See application file for complete search history.

(56) References Cited

U.S. PATENT DOCUMENTS 3,037,552 A * 6/1962 Foulon ................ F02C 7/232
239/571
3,738,104 A 6/1973 Rosa
(Continued)

FOREIGN PATENT DOCUMENTS

EP 2187023 A1 5/2010

OTHER PUBLICATIONS

European Search Report for Application No. 15170576.1-1607; dated Oct. 26, 2015; 6 pgs.

*Primary Examiner* — Alain Chau
(74) *Attorney, Agent, or Firm* — Cantor Colburn LLP

(57) ABSTRACT

The present disclosure relates generally to a method for determining a failure of a flow divider within a fuel system, the method being performed by a controller and comprising the steps of: delivering a fuel command, calculating an expected fill time, wherein the expected fill time is indicative of the time required to fill a known fuel manifold volume, determining whether the actual fill time is greater than or equal to an expected fill time; and determining whether an actual fuel pressure value is less than or equal to an expect fuel pressure value based at least in part on at least one environmental signal.

10 Claims, 4 Drawing Sheets

(51) Int. Cl.
*F02C 9/26* (2006.01)
*F02C 9/46* (2006.01)
*F02D 41/22* (2006.01)
*G01L 13/00* (2006.01)
*F02C 7/236* (2006.01)
*G01M 15/14* (2006.01)

(52) U.S. Cl.
CPC .................. *F02C 9/26* (2013.01); *F02C 9/46* (2013.01); *G01M 15/14* (2013.01); *F02D 2041/223* (2013.01); *F02D 2041/224* (2013.01); *F02D 2041/225* (2013.01); *F05D 2270/09* (2013.01)

(56) References Cited

U.S. PATENT DOCUMENTS

| | | | | |
|---|---|---|---|---|
| 4,134,259 A | * | 1/1979 | Gardner | F02C 7/22 60/241 |
| 4,226,365 A | | 10/1980 | Norris et al. | |
| 4,716,719 A | * | 1/1988 | Takahashi | F02C 9/26 60/247 |
| 4,716,723 A | * | 1/1988 | Ralston | F01D 21/02 60/39.281 |
| 4,964,270 A | | 10/1990 | Taylor et al. | |
| 5,465,570 A | * | 11/1995 | Szillat | F02C 7/26 60/39.281 |
| 5,546,795 A | * | 8/1996 | Yamagishi | F02D 41/0007 73/114.33 |
| 6,092,546 A | | 7/2000 | Lebrun et al. | |
| 6,157,310 A | * | 12/2000 | Milne | G05B 23/0251 340/522 |
| 6,293,251 B1 | | 9/2001 | Hemmerlein et al. | |
| 6,651,442 B2 | * | 11/2003 | Davies | F02C 7/232 60/39.281 |
| 2004/0154302 A1 | * | 8/2004 | Wernberg | F02C 7/232 60/739 |
| 2005/0241318 A1 | * | 11/2005 | Buehman | F02C 7/22 60/773 |
| 2009/0313966 A1 | * | 12/2009 | Vanderleest | F02C 7/232 60/39.091 |
| 2011/0202256 A1 | | 8/2011 | Sauve et al. | |
| 2012/0048000 A1 | * | 3/2012 | Kirzhner | F02C 7/22 73/40.5 R |
| 2012/0095669 A1 | | 4/2012 | Katsurahara | |
| 2012/0174594 A1 | | 7/2012 | Winston et al. | |
| 2013/0239580 A1 | | 9/2013 | Corson et al. | |
| 2013/0269364 A1 | * | 10/2013 | Romig | F02C 7/232 60/779 |
| 2014/0053812 A1 | | 2/2014 | Kojima | |
| 2016/0238484 A1 | * | 8/2016 | Veyrat-Masson | B64D 37/00 |

* cited by examiner

METHOD FOR DETERMINING A FAULT WITHIN A FLOW DIVIDER

CROSS REFERENCE TO RELATED APPLICATIONS

The present application is related to, and claims the priority benefit of, U.S. Provisional Patent Application Ser. No. 62/007,587 filed Jun. 4, 2014, the contents of which are hereby incorporated in their entirety into the present disclosure.

TECHNICAL FIELD OF THE DISCLOSED EMBODIMENTS

The present disclosure is generally related to gas turbine engines and, more specifically, to a method of determining a fault within a flow divider.

BACKGROUND OF THE DISCLOSED EMBODIMENTS

Generally, auxiliary power unit (APU) designs include a flow divider valve to direct the flow of fuel between primary fuel injectors and main fuel injectors. In addition, there is a fuel pressure sensor that monitors the primary fuel pressure supplied to the primary fuel injectors.

During APU starting, the fuel system controller, typically a Full Authority Digital Electronic Control (FADEC), first schedules fuel while it determines when the fuel manifold is filled. While filling the manifold, the fuel system controller also commands the ignitor. The fill schedule is designed to fill quickly before the APU starter accelerates the APU beyond its light-off window. Once the fuel system controller detects that the manifold is filled, the fuel system controller schedules a light-off fuel schedule and monitors engine measured turbine temperature (EGT) in order to detect APU light-off.

The manifold is declared full when the fuel pressure sensor indicates filled pressure. If the flow divider fails in an open condition, fuel pressure will not build up in the manifold and the system will over fuel the APU which may result in a fail to start and excessive fuel collecting in the combustor.

The fuel system controller currently does not detect a failed flow divider. Improvements in determining a failed flow divider valve is therefore needed in the art.

SUMMARY OF THE DISCLOSED EMBODIMENTS

In one aspect, a method for determining a failure of a flow divider in an open position during engine starting is provided. The method includes the step of operating a controller to deliver a fuel command. In one embodiment, a fuel command further includes operating a fuel pump and metering valve to deliver fuel into a fuel manifold at a first fuel rate.

The method further includes the step of operating the controller to calculate an expected fill time of the fuel manifold, wherein the expected fill time is indicative of the time required to fill a known fuel manifold volume. In one embodiment, calculating the expected fill time is defined by the formula:

Mass Volume Fuel Manifold÷Command Rate

The method further includes the step of operating the controller to determine whether the expected fill time is greater than or equal to an actual fill time. In one embodiment, the actual fill time is indicative of the amount of time for the controller to receive a first signal from the fuel pressure sensor. In one embodiment, the first signal is indicative of an increase in fuel pressure.

If it is determined that the actual fill time is greater than the expected fill time, the method proceeds to the step of operating the controller to send a signal to annunciate a first condition. If it is determined that the actual fill time is less than or equal to the expected fill time, the method proceeds to the step of determining whether an actual fuel pressure value is less than or equal to an expected fuel pressure value based at least in part on at least one environmental signal. The controller calculates an expected fuel pressure value based at least in part on at least one of a plurality of environmental signal values. The controller compares the actual fuel pressure value, transmitted from pressure sensor, against the calculated expected fuel pressure value based on the at least one environmental signal value. If it is determined that the actual fuel pressure value is less than the calculated expected fuel pressure value, the method then proceeds to the step of operating the controller to annunciate a signal indicative of a second condition. In one embodiment, the second condition may be indicative that the flow divider valve has failed in an open condition. If it is determined that the actual fuel pressure value is greater than or equal to the expected fuel pressure value, then the method returns to the step of operating the controller to deliver a fuel command Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

Figure 1:
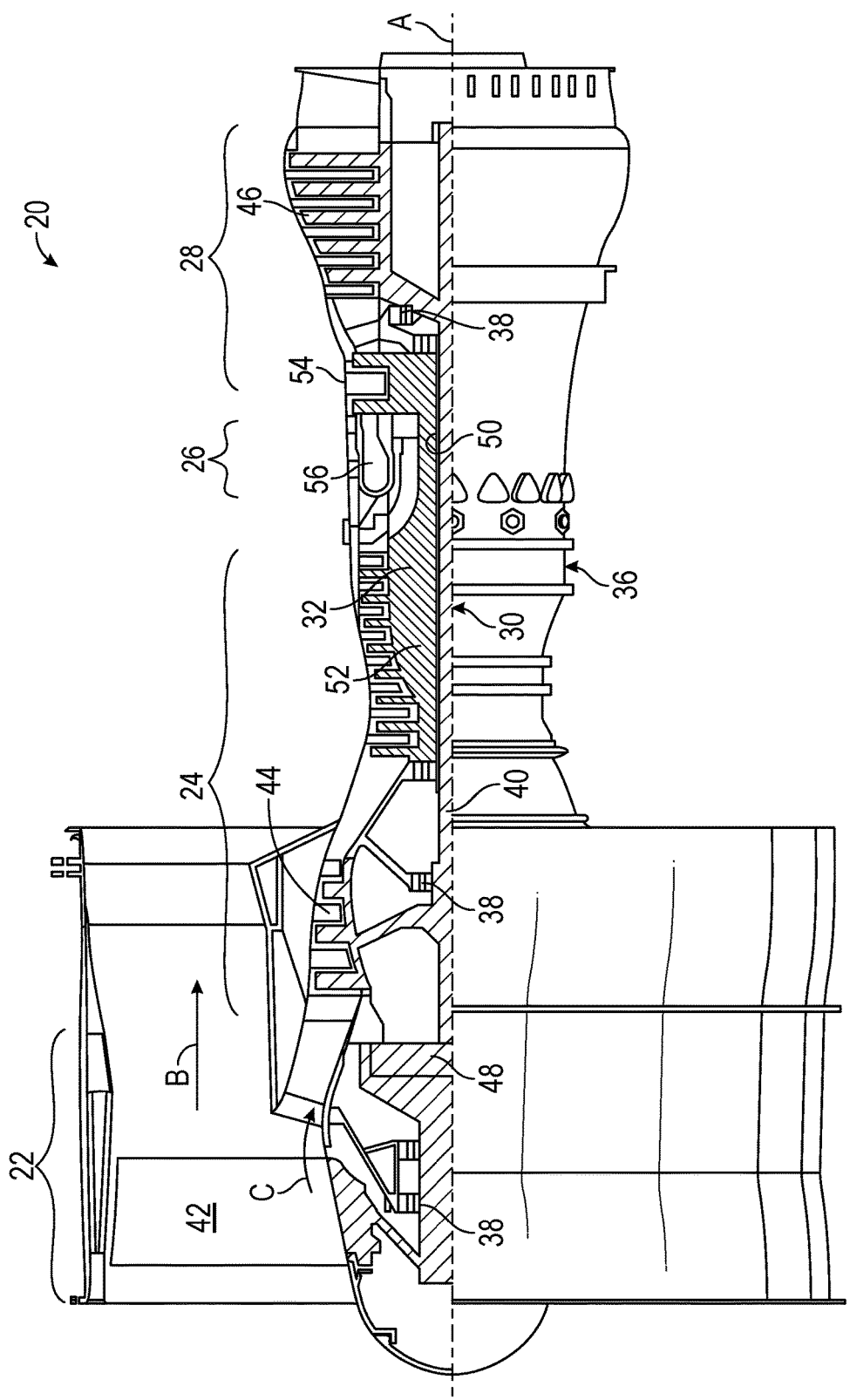
FIG. 1 is a schematic cross-sectional view of a gas turbine engine.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

Figure 2:
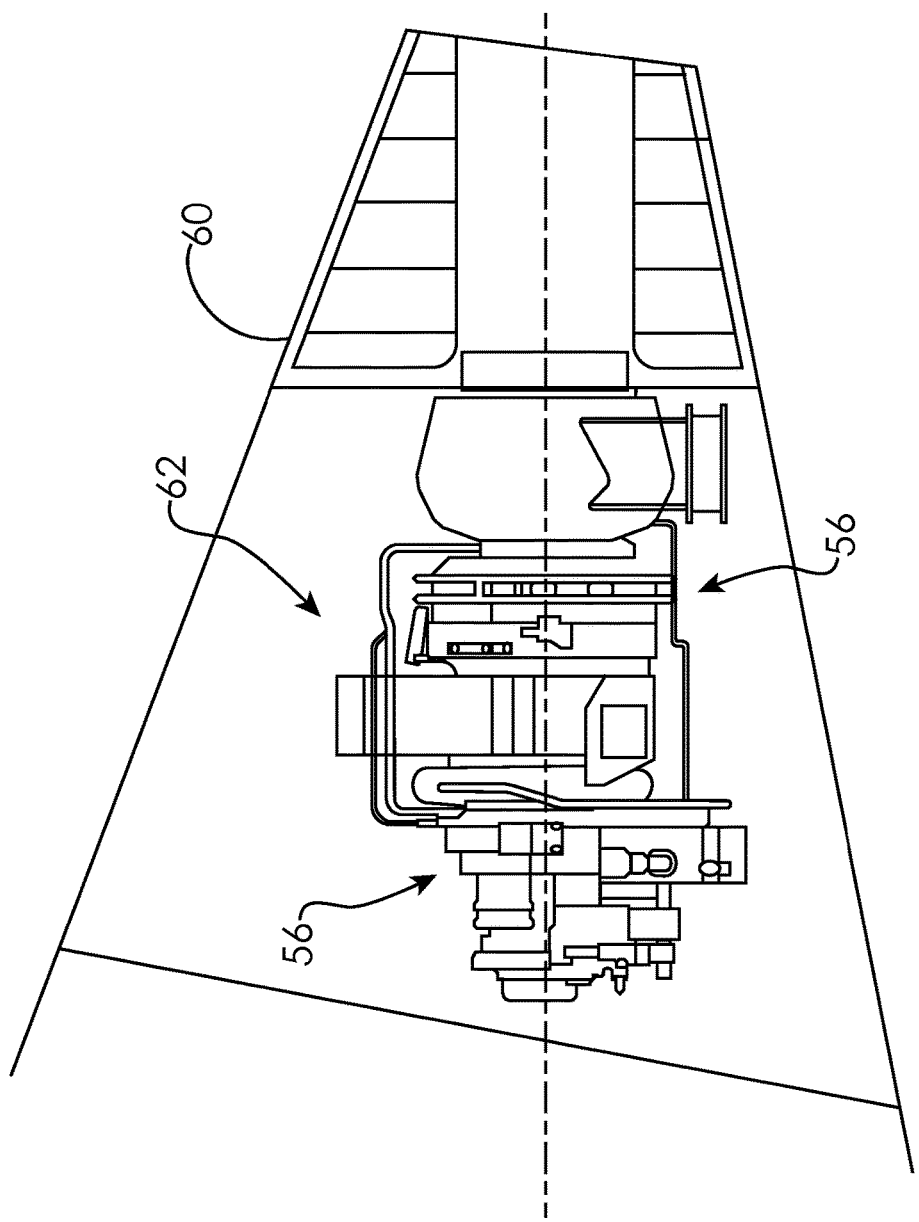
FIG. 2 is a schematic side view of an auxiliary power unit within a tail section of an aircraft.

Referring to FIG. 2, a tail section 60 of an example aircraft houses an APU 62. As known, the APU 62 is used to provide mechanical shaft power and pressurized air for use in the aircraft electrical generator and air management systems (not shown).

The APU 62 includes the combustor 56. Fuel is delivered to the combustor 56 during operation of the APU 62. As known, during startup of the APU 62, fuel must be delivered to the combustor 56 at a sufficient rate or the combustor 56 will not achieve light-off. Delivering too much fuel to the combustor 56 may undesirably over-fuel the combustor 56, which may result in a failure to light.

Figure 3:
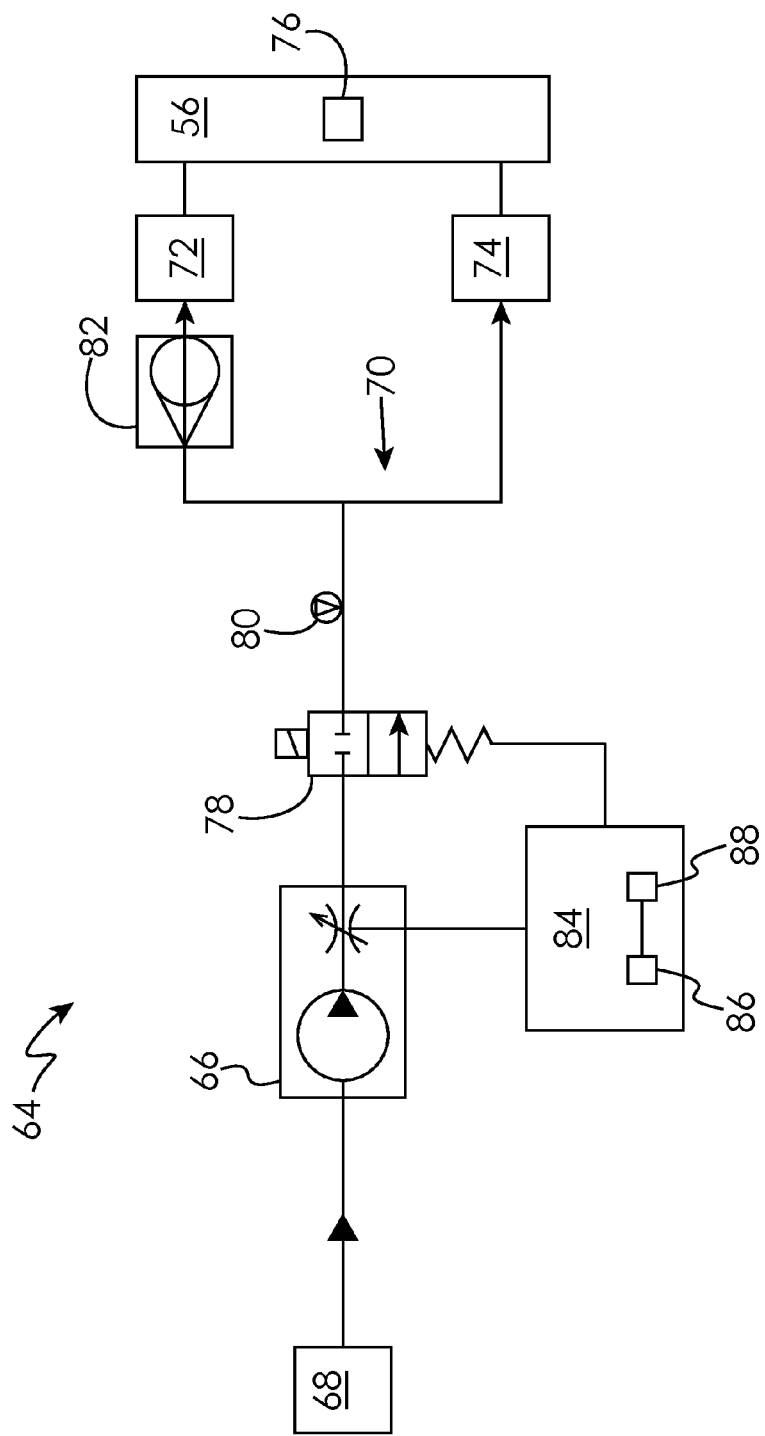
FIG. 3 is a schematic diagram of an example fuel delivery system.
Figure 4:
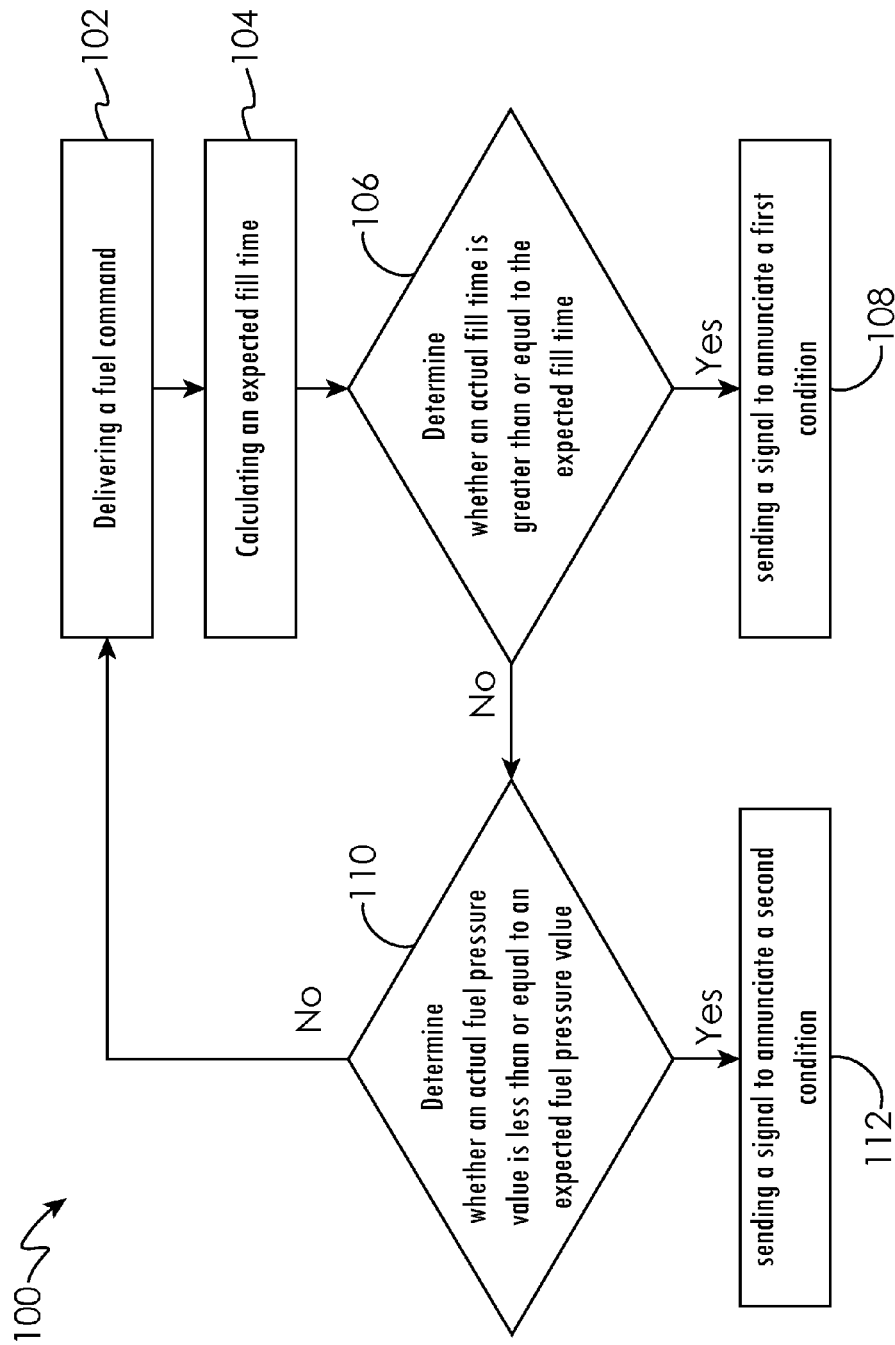
FIG. 4 is a schematic flow diagram of a method for determining a failure of a flow divider within a fuel system, with the method being performed by a controller.

Referring to FIGS. 3-4 with continuing reference to FIG. 2, an example fuel delivery system 64 delivers (or injects) fuel into the combustor 56. The fuel delivery system 64 includes a gearbox driven fuel pump and metering valve 66 that delivers fuel from a fuel supply 68 to a fuel manifold 70 including a plurality of primary fuel injectors 74 and a plurality of main fuel injectors 72. The fuel pump and metering valve 66 is a type of variable component. For example, the fuel pump and metering valve 66 includes components that can be selectively moved (or varied) between positions that provide more fuel and positions that provide less fuel.

Both the primary fuel injectors 74 and the main fuel injectors 72 inject fuel directly into the combustor 56. When fuel is delivered from the primary fuel injectors 70 and the main fuel injectors 72 at an appropriate rate, at least one igniter 76 within the combustor 56 will ignite the fuel causing the combustor 56 to light-off The fuel delivery system 64 also includes a solenoid 78, and a pressure sensor 80 operably coupled to an engine controller 84. The fuel delivery system further includes a flow divider valve 82 coupled to the fuel manifold 70. The example engine controller 84 is a FADEC (Full Authority Digital Electronic Control) controller that is configured to vary a flow command to the fuel delivery system 64 by adjusting components of the fuel pump and metering valve 66. A person having skill in this art and the benefit of this disclosure would understand how to adjust flow from the fuel pump and metering valve 66 using the controller 84. The pressure sensor 80 is configured to split and correctly pressurize the injector fuel delivery.

The controller 84 is also able to stop flow through the fuel delivery system 64, regardless of the positioning of the fuel pump and metering valve 66, by sending commands to the solenoid 78.

In this example, the controller 84 includes a memory 86 and a processor 88. The processor 88 is configured to execute a program stored in the memory 86. The example memory portion 86 stores a program such as a method 100 that is executed during startup of the APU 62.

FIG. 4 illustrates a method for determining whether the flow divider valve 82 has failed in an open position during engine starting, the method includes step 102 of operating the controller 84 to deliver a fuel command. In one embodiment, a fuel command further includes operating the fuel pump and metering valve 66 to deliver fuel into the fuel manifold 70 at a first fuel rate. For example, the controller 84 initializes the fuel command by commanding APU 62 to rotate, causing the gearbox driven fuel pump and metering valve 66 to deliver fuel at the first fuel rate, at approximately 36 lbm/hr. (16.33 kg/hr.) to name one non-limiting example.

The method 100 further includes step 104 of operating the controller 84 to calculate an expected fill time of the fuel manifold 70, wherein the expected fill time is indicative of the time required to fill a known fuel manifold volume. In one embodiment, calculating the expected fill time is defined by the formula:

$$\text{Mass Volume Fuel Manifold} \div \text{Command Rate}$$

For example, if the fuel manifold 70 contains a mass volume of 0.032 lbs. (0.015 kg.), and the controller 84 schedules a fuel command rate of 36 lbm/hr. (16.33 kg/hr.), it would be expected for the fuel manifold 70 to fill in 3.2 seconds (0.032 lbm÷(36 lbm/hr.×1 hr./60 min.×1 min./60 sec).

The method 100 further includes step 106 of operating the controller 84 to determine whether the expected fill time is greater than or equal to an actual fill time. In one embodiment, the actual fill time is indicative of the amount of time for the controller 84 to receive a first signal from the fuel pressure sensor 80. In one embodiment, the first signal is indicative of an increase in fuel pressure. For example, when the fuel manifold 70 is being filled, pressure will build against the flow divider valve 82. If the flow divider valve 82 fails in the open position, pressure as indicated by the pressure sensor 80 will not build against the flow divider valve 82 as expected.

If it is determined that the actual fill time is greater than the expected fill time, the method proceeds to step 108 of operating the controller 84 to send a signal to annunciate a first condition. It will be appreciated that the signal may be a visual and/or audible signal to name two non-limiting examples. To continue with the example above, if the pressure sensor 80 does not detect a rise in pressure within 3.2 seconds; then, it may be determined that either the fuel delivery is not delivering at the expected rate, the pressure sensor 76 has failed to read a fuel pressure, or the flow divider valve 78 has failed in the open position.

If it is determined that the actual fill time is less than or equal to the expected fill time, the method proceeds to step 110 of determining whether a first fuel pressure value is less than or equal to at least one environmental parameter value. For example, the controller 84 stores a plurality of parameter values (e.g. ground and/or inflight altitude, temperature, air speed, fuel command, and inlet pressure to name a few non-limiting examples) within memory 86. The controller 84 calculates an expected fuel pressure value based at least in part on at least one of a plurality of environmental signal values. The controller 84 compares the actual fuel pressure value, transmitted from pressure sensor 80, against the calculated expected fuel pressure value based on the at least one environmental signal value. If it is determined that the actual fuel pressure value is less than the calculated expected fuel pressure value, the method then proceeds to step 112 of operating the controller 84 to annunciate a signal indicative of a second condition. The second condition may be indicative that the flow divider valve 82 has failed in an open condition. If it is determined that the actual fuel pressure value is greater than or equal to the at least one environmental parameter, then the method returns to step 102 of operating the controller 84 to deliver a fuel command.

It will be appreciate that if it is annunciated that a first condition or second condition exists, the first and/or second condition may be accommodated by preventing future engine starts until the first and/or second conditions are corrected, or by using alternative control logic that does not assume proper operation of the flow divider valve 82 to avoid over-fueling.

It will be appreciated that the controller 84 implements a process to determine whether a flow divider valve 82 has failed in an open position to reduce the undesirable result of delivering excess fuel to the combustor 56.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A method for determining a failure of a flow divider within a fuel system to a combustor of a gas turbine engine, including a controller, fuel manifold and fuel pressure sensor, the method being performed by the controller and comprising the steps of:
   delivering a fuel command to cause a fuel pump to deliver fuel to the fuel manifold, the fuel manifold including a flow divider valve configured to limit fuel delivery to the combustor;
   measuring an actual fuel pressure value with the fuel pressure sensor;
   ascertaining an actual fill time of the fuel manifold based on at least one of the step of delivering the fuel commend and the step of the measuring the actual fuel pressure;
   calculating an expected fill time, wherein the expected fill time is indicative of the time required to fill a known fuel manifold volume;
   determining whether the expected fill time is greater than or equal to the actual fill time;
   when the expected fill time is less than the actual fill time, sending a first signal with the controller to annunciate a first condition is indicative of a potential failure of the flow divider valve;
   when the expected fill time is greater than or equal to the actual fill time, determining whether the actual fuel pressure value is less than or equal to an expected fuel pressure value, the expected fuel pressure value being calculated based at least in part on at least one environmental signal; and
   when the actual fuel pressure value is less than or equal to an expected fuel pressure value, sending a second signal with the controller to annunciate a second condition, wherein the second condition is indicative of a potential failure of the flow divider valve.

2. The method of claim 1, wherein delivering the fuel command further comprises operating the fuel pump to deliver fuel into the fuel manifold at a first fuel rate.

3. The method of claim 1, wherein calculating an expected fill time is defined by the formula: Mass Volume Fuel Manifold÷Command Rate.

4. The method of claim 1, wherein the actual fill time comprises measuring the amount of time to receive a first pressure signal from the fuel pressure sensor.

5. The method of claim 4, wherein the first pressure signal is indicative of an increase in fuel pressure.

6. A fuel system for a gas turbine engine comprising:
   a fuel pump;
   a fuel manifold including a flow divider valve configured to limit fuel delivery to a combustor, the fuel manifold operably coupled to the fuel pump;
   a fuel pressure sensor operably coupled to the fuel manifold; and
   a controller operably coupled to the fuel pump and the fuel pressure sensor and configured to operate software to determine whether a flow divider valve is functional;
   wherein the controller is configured to:
      deliver a fuel command to cause a fuel pump to deliver fuel to the fuel manifold;
      measuring an actual fuel pressure value with the fuel pressure sensor;
      ascertaining an actual fill time of the fuel manifold based on at least one of the step of delivering the fuel command and the step of measuring the actual fuel pressure;
      calculate an expected fill time, wherein the expected fill time is indicative of the time required to fill a known fuel manifold volume;
      determine whether the expected fill time is greater than or equal to the actual fill time;
      when the expected fill time is less than the actual fill time, sending a first signal with the controller to annunciate a first condition is indicative of a potential failure of the flow divider valve;
      when the expected fill time is greater than or equal to the actual fill time, determine whether the actual fuel pressure value is less than or equal to an expected fuel pressure value, the expected fuel pressure value being calculated based at least in part on at least one environmental signal; and
      when the actual fuel pressure value is less than or equal to an expected fuel pressure value, sending a second signal with the controller to annunciate a second condition indicative of a potential failure of the flow divider valve.

7. The fuel system of claim 6, wherein the fuel command comprises operating the fuel pump to deliver fuel into the fuel manifold at a first fuel rate.

8. The fuel system of claim 6, wherein the expected fill time is defined by the formula: Mass Volume Fuel Manifold÷Command Rate.

9. The fuel system of claim 6, wherein the actual fill time comprises operating the controller to measure the amount of time to receive a first pressure signal from the fuel pressure sensor.

10. The fuel system of claim 9, wherein the first pressure signal is indicative of an increase in fuel pressure.

* * * * *